United States Patent
Shang et al.

(10) Patent No.: US 12,051,226 B2
(45) Date of Patent: Jul. 30, 2024

(54) FEATURE DETECTION METHODS AND SYSTEMS USING DECONSTRUCTED COLOR IMAGE DATA

(71) Applicant: Verizon Patent and Licensing Inc., Basking Ridge, NJ (US)

(72) Inventors: Tom Hsi Hao Shang, Forest Hills, NY (US); Elena Dotsenko, Princeton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 419 days.

(21) Appl. No.: 17/411,999

(22) Filed: Aug. 25, 2021

(65) Prior Publication Data
US 2023/0064963 A1   Mar. 2, 2023

(51) Int. Cl.
| | |
|---|---|
| *G06T 7/80* | (2017.01) |
| *G06T 7/55* | (2017.01) |
| *G06T 7/90* | (2017.01) |
| *G06V 10/143* | (2022.01) |
| *G06V 10/44* | (2022.01) |
| *H04N 9/64* | (2023.01) |

(52) U.S. Cl.
CPC .............. *G06V 10/143* (2022.01); *G06T 7/55* (2017.01); *G06T 7/80* (2017.01); *G06T 7/90* (2017.01); *G06V 10/44* (2022.01); *H04N 9/64* (2013.01); *G06T 2207/10024* (2013.01)

(58) Field of Classification Search
CPC ...... G06V 10/143; G06V 10/44; G06V 10/54; G06V 10/56; G06V 20/20; G06V 20/64; G06V 20/49; G06T 7/55; G06T 7/80; G06T 7/90; G06T 2207/10024; G06T 7/593; G06T 2207/10012; H04N 9/64; H04N 1/6047
USPC ........................................................ 382/163
See application file for complete search history.

(56) References Cited

U.S. PATENT DOCUMENTS

| | | | |
|---|---|---|---|
| 2004/0175031 A1* | 9/2004 | Katsuyama ................ G06T 7/11 |
| | | | 382/176 |
| 2007/0236438 A1* | 10/2007 | Sung ..................... G09G 3/3648 |
| | | | 345/88 |
| 2008/0136933 A1* | 6/2008 | Dosluoglu ........... H04N 3/1562 |
| | | | 348/E3.02 |
| 2008/0309790 A1* | 12/2008 | Nishiwaki .............. H04N 23/88 |
| | | | 348/E9.051 |
| 2014/0177953 A1* | 6/2014 | Shevchenko ...... H04N 1/32309 |
| | | | 382/164 |

(Continued)

*Primary Examiner* — Ali Bayat

(57) ABSTRACT

An illustrative image processing system extracts a first color-field image from an original color image associated with a set of color-field components. The first color-field image is associated with a first subset of the set of color-field components. The image processing system also extracts a second color-field image from the original color image. The second color-field image is associated with a second subset of the set of color-field components that is different from the first subset. The image processing system detects a first set of features within the first color-field image and a second set of features within the second color-field image. At least one feature is detected within the first color-field image and included in the first set of features while not being detected within the second color-field image or included in the second set of features. Corresponding methods and systems are also disclosed.

20 Claims, 9 Drawing Sheets

(56) References Cited

U.S. PATENT DOCUMENTS

2019/0075251 A1* 3/2019 Nakamura ............ G06T 3/4015

* cited by examiner

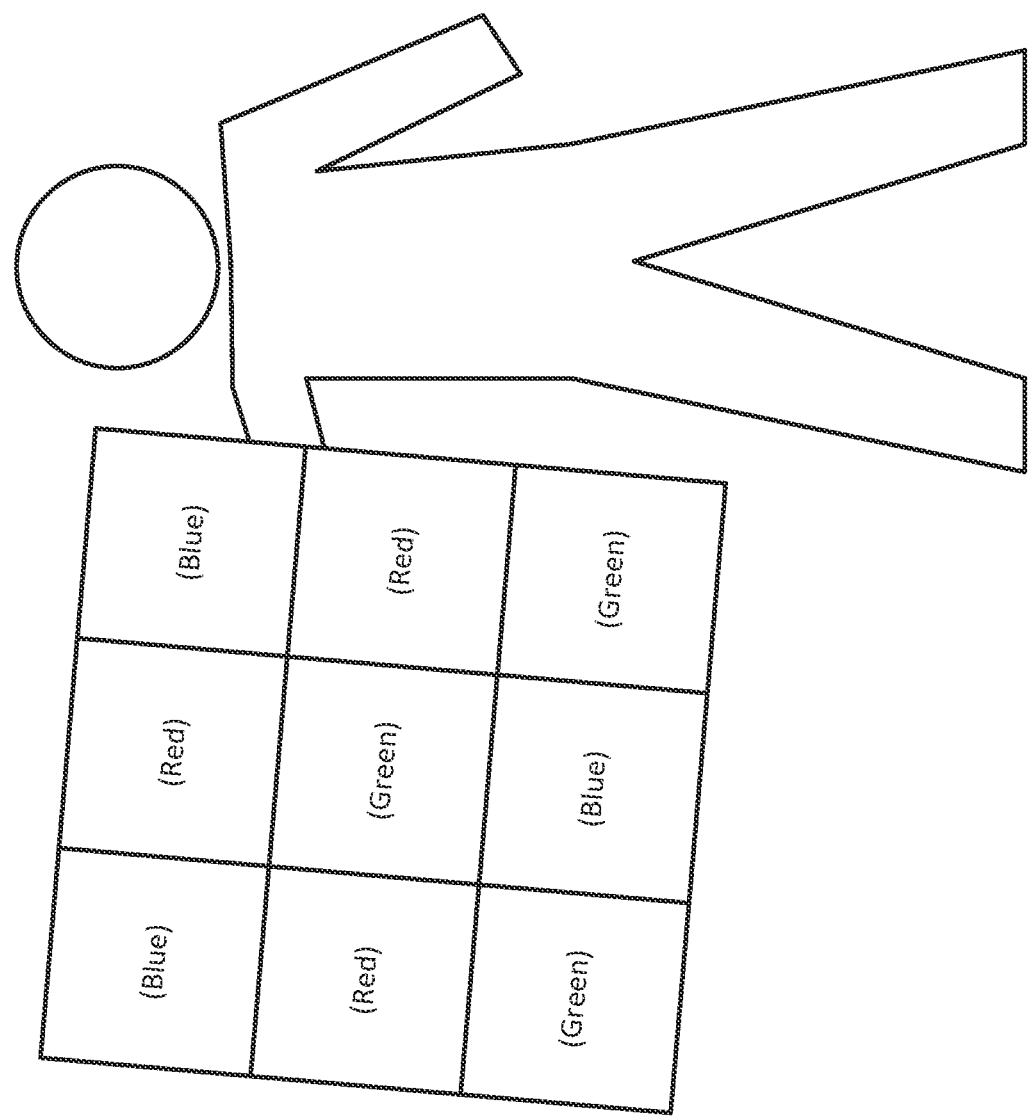

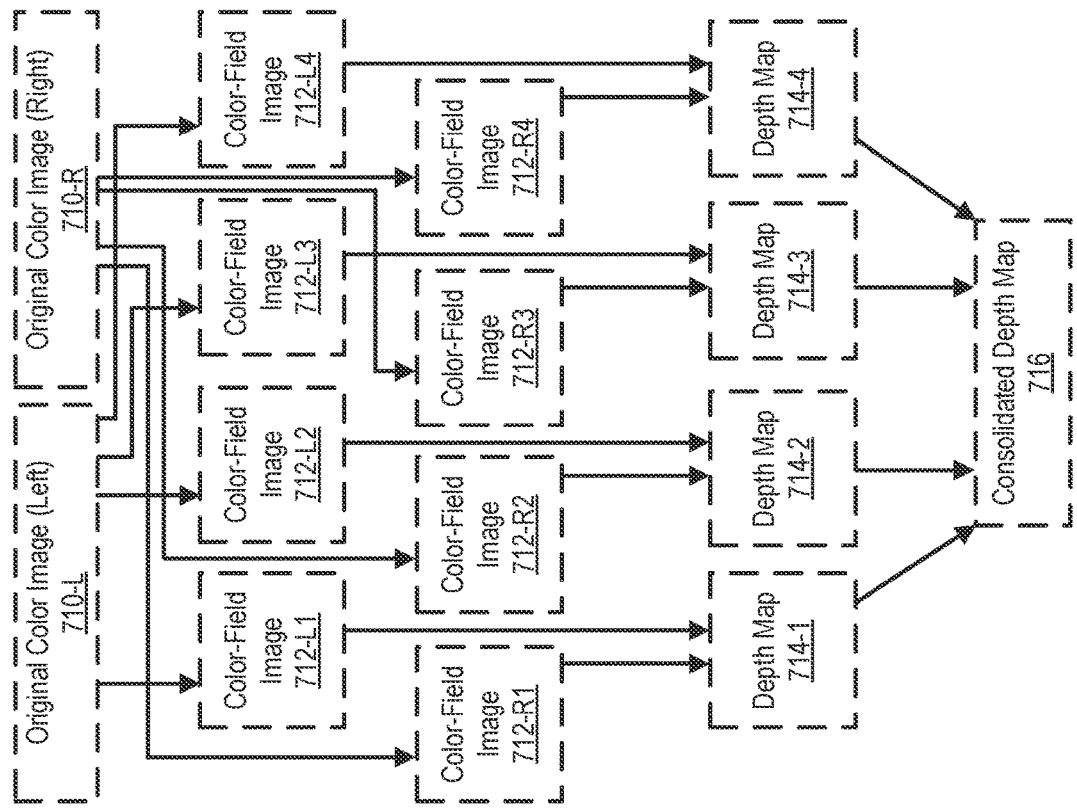
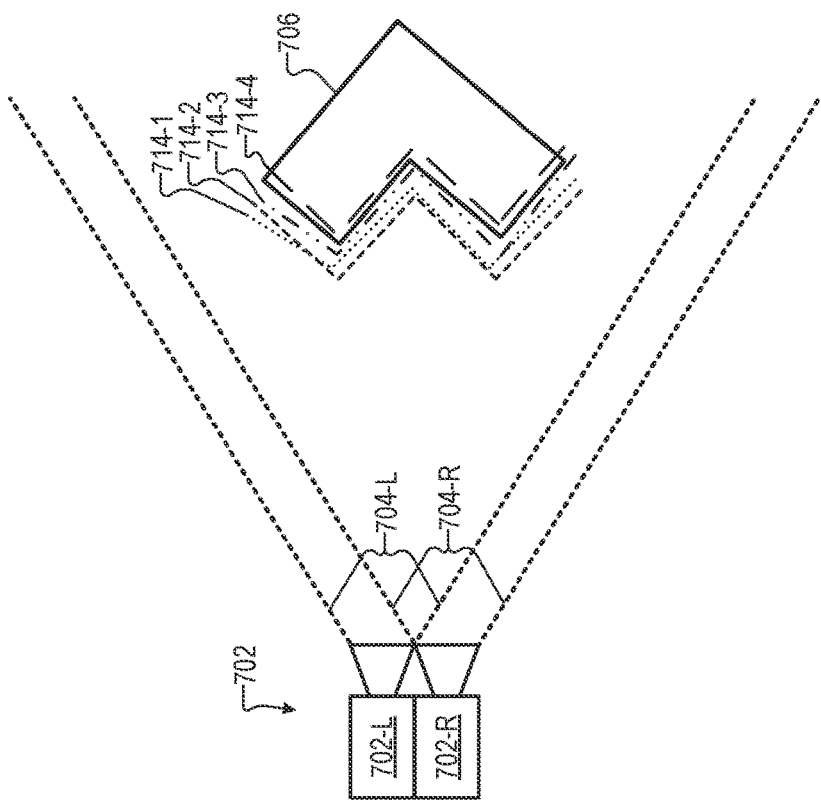
Fig. 7A
Fig. 7B

FEATURE DETECTION METHODS AND SYSTEMS USING DECONSTRUCTED COLOR IMAGE DATA

BACKGROUND INFORMATION

Computing systems are used to process images in various ways and for various purposes. For example, image processing systems may be configured to analyze an image (e.g., to determine what the image shows, to identify faces depicted in the image, etc.), to change or improve the image (e.g., to apply a filter to alter the character of the image, to remove noise or unwanted artifacts from the image, etc.), to use information represented in images to generate other data (e.g., to use the image to create a depth map of a scene depicted by the image, to model or reconstruct object surfaces to generate a volumetric or other representation of the image content, etc.), and/or to perform various other such image processing operations.

For some types of image processing, it may be desirable (e.g., as an initial or intermediate step in an image processing operation or process) to detect features within an image (also referred to as "image features"). For instance, features such as edges, corners, ridges, regions of interest points ("blobs"), and so forth, may all be useful to detect within an image that is to be processed in some way. Efficient and reliable feature detection may facilitate various types of image processing useful for various applications. As one example, analyzing detected image features may enable machine vision and object recognition algorithms (e.g., algorithms for facial recognition, object identification, pose analysis, etc.). As another example, detecting features within two similar images (e.g., images depicting at least some of the same content) may allow for the images to be compared, combined, correlated, or the like, thereby allowing creation of panoramic images, depth maps, volumetric models, and other useful data structures.

BRIEF DESCRIPTION OF THE DRAWINGS

The accompanying drawings illustrate various implementations and are a part of the specification. The illustrated implementations are merely examples and do not limit the scope of the disclosure. Throughout the drawings, identical or similar reference numbers designate identical or similar elements.

FIG. 6 shows an illustrative calibration object that may be used to facilitate calibration of image capture devices in accordance with principles described herein.

FIG. 7A shows illustrative image capture devices capturing images of an object from stereoscopically-related viewpoints to map the depth of the object in accordance with principles described herein.

FIG. 7B shows an illustrative dataflow for generating a consolidated depth map of the object of FIG. 7A based on deconstructed color image data in accordance with principles described herein.

DETAILED DESCRIPTION OF EXAMPLE EMBODIMENTS

Figure 1:
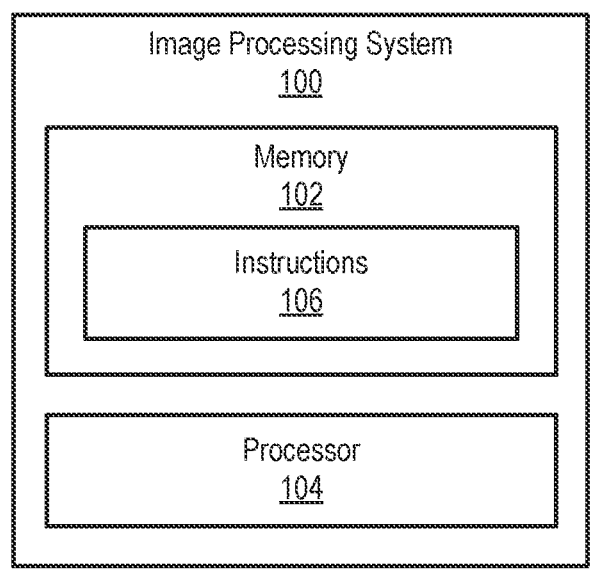
FIG. 1 shows an illustrative image processing system configured to perform feature detection using deconstructed color image data in accordance with principles described herein.

Feature detection methods and systems using deconstructed color image data are described herein. As mentioned above, feature detection methods and systems are used for various types of image processing in various applications. Conventionally, for example, a color image may be converted to grayscale and processed with a feature detection algorithm that detects certain structures or properties of pixels or groups of pixels in the grayscale image (e.g., abrupt changes from dark pixels to light pixels that occur at corners or edges of specific image content, etc.) and collects these as a set of features of the image. Various algorithms may be useful for detecting features in this way, including algorithms that analyze neighborhood patches of pixels and generate feature descriptors configured to be invariant to changes in illumination, rotation, scale, and/or other such variables.

Rather than relying exclusively on a grayscale version of an image to detect the features of the image, feature detection methods and systems described herein rely on deconstructed color image data. For example, for an original color image represented in an RGB image format, the original image may be analyzed not only in its original format and/or in grayscale, but additionally or alternatively in other ways that may more efficiently and clearly reveal certain features. These other ways of analyzing the image may involve various different color-field images associated with the original color image in ways described herein.

A color-field image associated with an original color image refers to an image derived from one or more color-field components of the image. For example, an original color image in an RGB image format (i.e., a representation of an image that utilizes an RGB color model for representing color information for the image, also referred to herein as an "RGB-formatted" color image) may include a red color-field component (R), a green color-field component (G), and a blue color-field component (B). As such, color-field images associated with this type of original color image may include a red color-field image that only incorporates the red color-field component, a green color-field image that only incorporates the green color-field component, and a blue color-field image that only incorporates the blue color-field component. Additionally, other color-field images that incorporate different combinations of these color-field components (e.g., a red-green color-field image, a red-blue color-field image, a green-blue color-field image, etc.) may also be associated with an RGB-formatted color image.

While various implementations described herein illustratively employ the RGB image format, it will be understood that original color images represented using other image formats may similarly be associated with various color-field images that may be analyzed individually in the ways described herein. For instance, image formats relying on various color models (e.g., HSV, YCbCr, Lab, CMY, CMYK, etc.) may be deconstructed into various distinct color-field images each associated with one or more color-field components of that image format. These color-field images may then be similarly analyzed on an individual basis in analogous ways to those described herein for deconstructed RGB-formatted image data.

As will be described in more detail below, there are various advantages of using deconstructed color image data for feature detection as described herein. For example, compared to a conventional approach that relies only on grayscale image data, more image features may be detected from a given color image and the image features that are identified may be detected with higher confidence and reliability. This results from the fact that each color-field component incorporates specific information that may be unique to that color-field component and may be lost or overlooked in a grayscale conversion of the image data. For example, a green color-field component may incorporate a substantial amount of information for a color image depicting a forest scene, a red color-field component may incorporate a substantial amount of information for a color image depicting a desert scene, and a blue color-field component may incorporate a substantial amount of information for a color image depicting an underwater scene.

To illustrate a specific example, a color image will be considered that depicts a bright red boat afloat in a blue sea. When this image is converted to grayscale, the boat and the waves on the sea may both be represented by relatively similar shades of gray. As such, while many features may be detected in the grayscale image for both the water and the boat, these features may not reliably reveal a strong distinction between the boat and the water. In contrast, by detecting features of this image separately in a red color-field image and a blue color-field image, and by then combining the features detected in both of these analyses, more feature information (and more reliable feature information) may be generated. This is due, at least in part, to a significantly starker contrast between the boat and the water in both the red and blue color-field images as compared to in the grayscale image. This contrast facilitates reliable image feature detection, particularly around borders of the red boat and the blue sea.

In some examples, deconstructed color image data (e.g., one or more of the color-field images described above) may be used in combination with grayscale conversion and/or other conventional approaches for feature detection. In other examples, feature detection methods and systems described herein may rely exclusively on deconstructed color image data and not grayscale data. Both of these approaches may have their own advantages. Specifically, grayscale-based feature detection may reveal additional information that is not provided by any individual color-field image, thus providing another valuable datapoint in certain implementations. On the other hand, transformation of color data to a grayscale map may be more computationally expensive than generating a particular color-field image, thus saving compute cycles and increasing speed and efficiency for implementations where this conversion is avoided. For example, while a color-field image may be generated with little or no computational effort (e.g., the red color-field image is an image that includes only an R value for each pixel and omits G and B values), a grayscale image may require calculating each pixel based on a combination of R, G, and B values and predetermined coefficients (e.g., according to the equation: Gray=0.2126 R+0.7152 G+0.0722 B or another suitable conversion equation).

Various applications may be served by improved feature detection methods and systems described herein. As one example, improved feature detection that leverages deconstructed color image data in the ways described herein may increase the effectiveness and efficiency of applications relying on computer vision, object recognition, facial recognition, and so forth. As another example, this improved feature detection may facilitate volumetric capture and modeling systems configured to capture imagery and reconstruct surfaces for volumetric representations (e.g., real-time volumetric models, etc.) of three-dimensional ("3D") objects in real-world scenes. For instance, feature detection methods and systems described herein may improve calibration of image capture devices used for such volumetric capture systems, improve depth detection of 3D surfaces being modeled, and otherwise facilitate the generation of more accurate volumetric representations.

Volumetric representations of 3D objects may be useful for generating media content such as video game content, movie special effects, television sports and news effects, and so forth. Additionally, volumetric representations of 3D objects may be useful in various other applications including security applications (in which security cameras locate and/or track people and objects within a secured space), computer-aided design applications (in which 3D models are scanned for 3D printing and/or other purposes), computer vision applications (in which information about 3D objects is extracted to implement autonomous processes based on the information), and/or various other entertainment, educational, industrial, commercial, vocational, promotional, and/or other suitable applications and use cases.

In certain examples, volumetric representations of objects in a scene may be presented by an extended reality device (e.g., a virtual reality, augmented reality, or other such device) that provides a representation of the scene and/or the objects to be experienced by one or more users by way of extended reality technologies such as virtual reality, augmented reality, and/or other such technologies. In some examples, extended reality content may be generated in real time to allow users to experience live events (e.g., sporting events, concerts, news events, celebratory events, etc.) occurring at the scene. In other examples, extended reality content may be generated and stored for experiencing in a time-shifted manner. Various types of extended reality technologies using volumetric representations such as described above are used to engage in various types of extended reality experiences. As one example, certain technologies provide virtual reality experiences whereby users become fully immersed in a virtual reality world in which they can move about and see, hear, and/or interact with virtual objects and/or virtual avatars of other users in ways analogous to real-world experiences. As another example, certain technologies provide augmented reality experiences (also referred to as mixed reality experiences) whereby users continue to experience the real world around them to at least some extent (e.g., seeing real objects in their environment by way of a partially transparent heads-up display, video passed through from a head-mounted camera, etc.) while also being presented with virtual elements and augmentations that do not exist in the real world. For instance, virtual objects or characters may be presented as part of an augmented reality game or other entertainment application, virtual instructions or other information may be presented as part of an augmented reality educational application (e.g., an application designed to support a student in a science lab, etc.), virtual schematics or datasheets may be presented as part of an augmented reality occupational support application (e.g., to support a welder on a manufacturing floor, a car mechanic in a repair shop, etc.), or the like.

Various specific implementations will now be described in detail with reference to the figures. It will be understood that the specific implementations described below are provided as non-limiting examples of how various novel and inventive principles may be applied in various situations. Additionally, it will be understood that other examples not explicitly described herein may also be captured by the scope of the claims set forth below. Feature detection methods and systems using deconstructed color image data may provide any of the benefits mentioned above, as well as various additional and/or alternative benefits that will be described and/or made apparent below.

FIG. 1 shows an illustrative image processing system 100 ("system 100") configured to perform feature detection using deconstructed color image data in accordance with principles described herein. System 100 may be implemented by computer resources such as processors, memory facilities, storage facilities, communication interfaces, and so forth. In some examples, system 100 may be partially or fully implemented by image capture devices (e.g., still or video cameras, depth capture devices, etc.), user equipment devices such as dedicated extended reality presentation devices (e.g., head-mounted devices, handheld devices, etc.), mobile devices (e.g., smartphones, tablet devices, etc.), personal computers, or other equipment used directly by end users. Additionally or alternatively, system 100 may be partially or fully implemented by computing systems that are located remotely from image capture setups (e.g., volumetric capture systems including cameras) and/or from users engaged in extended reality experiences. For example, system 100 may be partially or fully implemented by distributed computing systems operated by a cellular data provider (e.g., multi-access edge compute (MEC) systems), distributed computing systems operated by a cloud-computing provider (e.g., multi-access cloud compute systems), or other suitable computing systems.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with feature detection using deconstructed color image data according to methods and systems described herein and/or as may serve a particular implementation.

Figure 2:
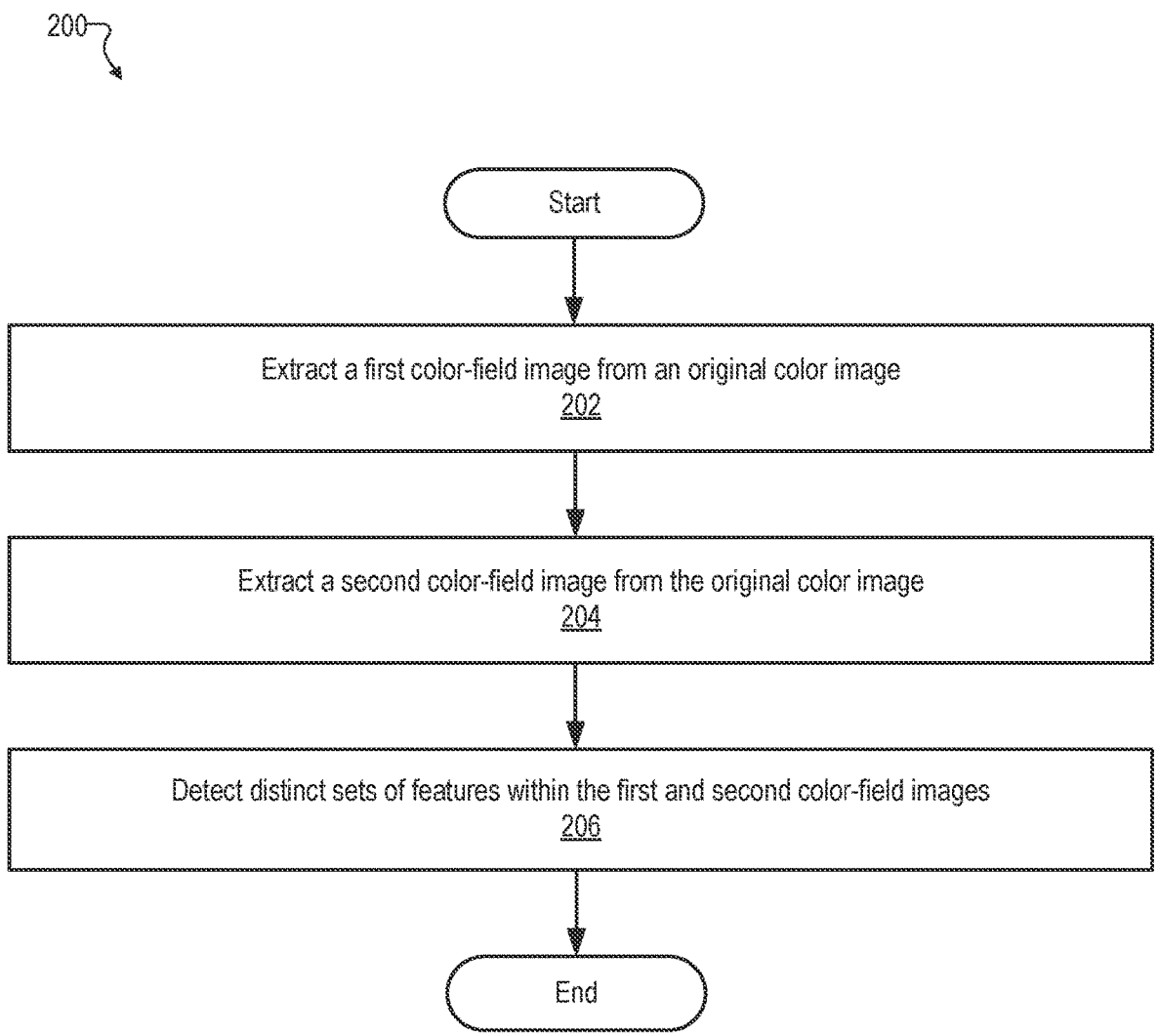
FIG. 2 shows an illustrative feature detection method that uses deconstructed color image data in accordance with principles described herein.

As one example of functionality that processor 104 may perform, FIG. 2 shows an illustrative feature detection method 200 ("method 200") that uses deconstructed color image data in accordance with principles described herein. While FIG. 2 shows illustrative operations according to one implementation, other implementations may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by an image processing system such as system 100 and/or any implementation thereof.

In some examples, the operations of FIG. 2 may be performed in real time so as to provide, receive, process, and/or use data described herein immediately as the data is generated, updated, changed, exchanged, or otherwise becomes available. Moreover, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-206 of method 200 will now be described in more detail as the operations may be performed by system 100 (e.g., by processor 104 as processor 104 executes instructions 106 stored in memory 102).

At operation 202, system 100 may extract a first color-field image from an original color image. The original color image may be associated with a set of color-field components. For instance, referring back to the example described above, the set of color-field components for an RGB-formatted color image may include a red (R) color-field component, a green (G) color-field component, and a blue (B) color-field component. In other examples, the original color image may be represented using a different image format or color model, and, as a result, may be associated with different types of color-field components. For instance, an original color image represented in a CMYK image format may be associated with a set of color-field components including a cyan (C) color-field component, a magenta (M) color-field component, a yellow (Y) color-field component, and a black or key (K) color-field component.

Regardless of the color-field components that may be associated with a particular image format or color model used to represent the original color image, the first color-field image extracted at operation 202 may include a first subset of the set of color-field components. For instance, in certain examples the subset may include only an individual color-field component. For instance, the first color-field image extracted at operation 202 could include a subset of color-field components that includes only the red (R) color-field component of the RGB image format (thus making the color-field image in this example a red color-field image), only the green (G) color-field component of the RGB image format (thus making the color-field image in this example a green color-field image), or only the blue (B) color-field component of the RGB image format (thus making the color-field image in this example a blue color-field image). In other examples, the subset of color-field components with which the first color-field image extracted at operation 202 is associated may include a combination of color-field components. For instance, the first color-field image could include a subset of color-field components that includes both the red and green color-field components (thus making the color-field image in this example a red-green color-field image), both the green and blue color-field components (thus making the color-field image in this example a green-blue color-field image), or both the red and blue color-field components (thus making the color-field image in this example a red-blue color-field image).

At operation 204, system 100 may extract a second color-field image from the original color image. Similar to the first color-field image extracted at operation 202, the second color-field image may be associated with a subset of the set of color-field components. However, this second subset of color-field components with which the second color-field image is associated may be different from the first subset of color-field components with which the first color-field image is associated. In this way, more information may be derived from the color-field images and the feature detection performed may be improved in the ways described above and as will be made apparent below. For instance, if the first color-field image is a red color-field image, the second color-field image extracted at operation 204 may be a green color-field image or a blue color-field image. While the example of method 200 relates only to two different color-field images that are extracted from the original color image, it will be understood (as well as described in more detail below) that various additional color-field images may also be extracted and relied on for the feature detection as may serve a particular implementation.

At operation 206, system 100 may detect distinct sets of features within each of the color-field images that have been extracted. Specifically for this example, system 100 may, at operation 206, detect a first set of features within the first color-field image and a second set of features within the second color-field image. As has been mentioned, the advantage of detecting features within the different color-field images is that more features may be identified (and more reliably identified) by leveraging the information in the various color-field images rather than losing and ignoring much of this information (as would occur if feature detection is based only on grayscale data as in conventional approaches). As such, it will be understood that at least one feature may be detected within the first color-field image (and included in the first set of features) that is not detected within the second color-field image (or included in the second set of features). Similarly, it may also be the case that at least one feature is detected within the second color-field image (and included in the second set of features) while not being detected within the first color-field image (or included in the first set of features).

After method 200 has been performed and the first and second sets of features (as well as additional sets of features for additional extracted color-field images in certain examples) have been detected, additional operations may be performed to various ends appropriate for various types of applications. For instance, in certain implementations, the various sets of image features may be combined into a consolidated set of features that is more complete, accurate, and reliable than any of the individual sets of features (e.g., the first or second sets of features). Additionally or alternatively, as will be described and illustrated in more detail below, the sets of features (e.g., either individually or after being consolidated) may be utilized in calibration operations, depth mapping operations, surface reconstruction operations, volumetric modeling operations, and/or any other follow-on operations as may serve a particular implementation.

Figure 3:
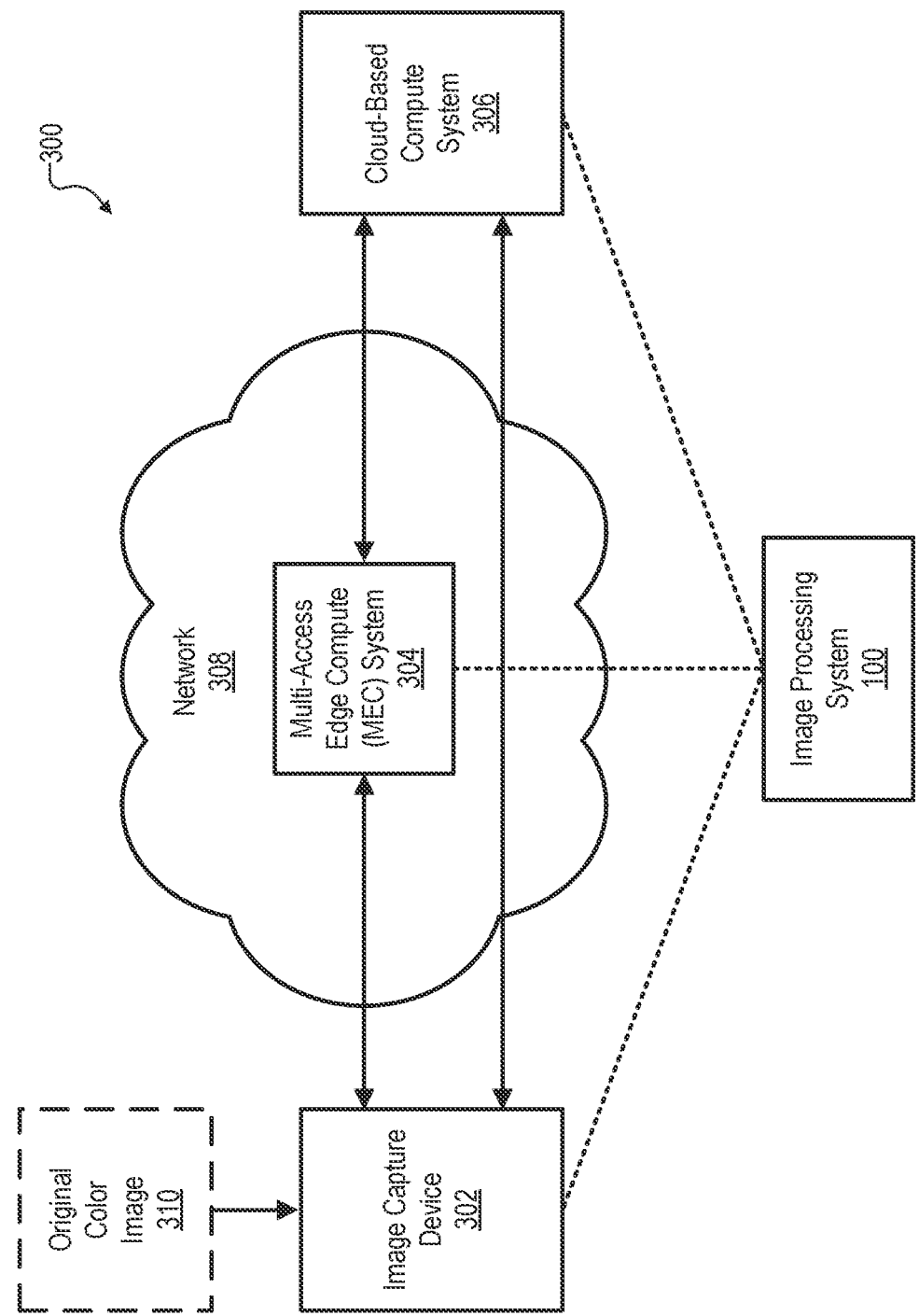
FIG. 3 shows an illustrative configuration in which the image processing system of FIG. 1 may operate in accordance with principles described herein.

FIG. 3 shows an illustrative configuration 300 in which system 100 may operate in accordance with principles described herein. Specifically, as illustrated by dotted lines connected to system 100 at the bottom of the figure, system 100 may be implemented by one or more of an image capture device 302, a MEC system 304, a cloud-based multi-access compute system ("cloud system") 306, and/or any other suitable device or system as may serve a particular implementation. For instance, certain implementations of system 100 may be implemented exclusively by one of these devices or systems such that the device or system performs method 200 while in communication with the other devices and/or systems. Other implementations of system 100 may be implemented by a combination of these devices and/or systems such that different devices and/or systems perform different parts of method 200 while communicatively coupled to the other devices and/or systems.

Image capture device 302 may be implemented as any suitable device configured to capture (or otherwise access, receive, store, process, etc.) color image data. For instance, image capture device 302 may be implemented by a still or video camera, a stereoscopic depth capture device, a general-purpose mobile device (e.g., a smartphone, a tablet device, etc.) with a built-in camera, a special-purpose extended reality device (e.g., a head-mounted augmented or virtual reality device, etc.) with a built-in camera or that receives an image feed from another source, or another suitable type of device such as a laptop or desktop computer with a built-in camera or that is receiving image data from a camera. In certain implementations, image capture device 302 may be implemented by a stereoscopic image capture system including two image capture devices having stereoscopically-related viewpoints (i.e., viewpoints with pre-defined relationships that allow depth data to be derived from differences in image data captured from the viewpoints). For instance, stereoscopic cameras may be integrated into a smartphone, head-mounted extended reality device, or stationary image/depth capture device.

Figure 4B:
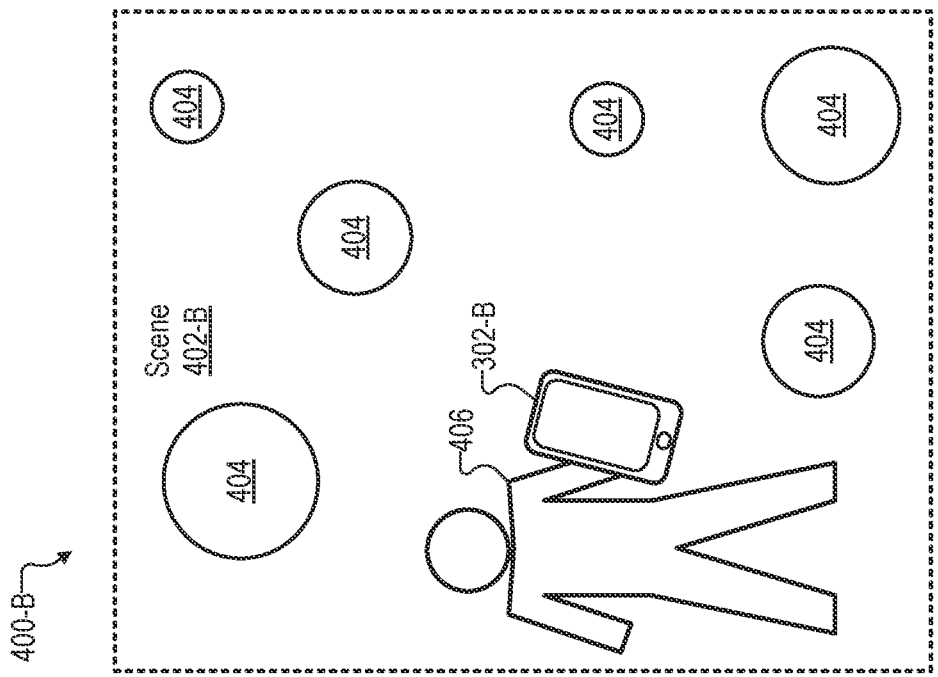
FIGS. 4A and 4B show illustrative scenes at which illustrative image capture devices capture images in accordance with principles described herein.
Figure 4A:
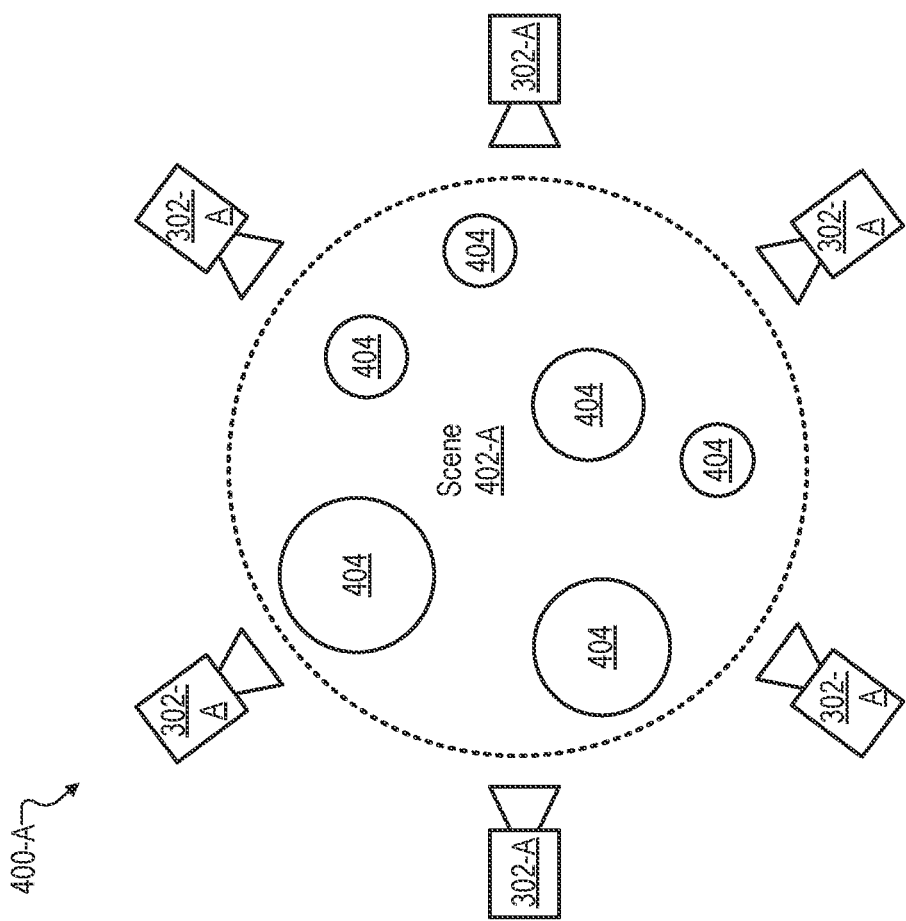

In some examples, image capture device 302 may be used by a user (not shown in FIG. 3) who directs what imagery the device captures at a particular scene (e.g., by pointing the camera, starting and stopping recording, etc.). To illustrate, FIGS. 4A and 4B show example scenes at which illustrative image capture devices capture images in accordance with principles described herein. More specifically, FIG. 4A shows a scene 402-A, FIG. 4B shows a scene 402-B, and both scenes 402-A and 402-B include a variety of objects 404 represented generically as circles of different sizes and which will be understood to represent any suitable people, animals, inanimate objects, or other objects as may be present within the respective scenes.

In FIG. 4A, imagery of scene 402-A and the objects 404 included therein is captured by an arrangement of image capture devices 302 surrounding the scene on multiple sides. The implementations of image capture device 302 in FIG. 4A are labeled as image capture devices 302-A and will be understood to represent stationary cameras (e.g., stereoscopic image capture systems configured to capture both image and depth data, as will be described in more detail below) that are arranged in a formation configured to facilitate volumetric capture of scene 402-A and objects 404. For instance, scene 402-A could be implemented as a playing area for a live sporting event (e.g., a basketball court on which a basketball game is being played) and objects 404 could be implemented as objects (e.g., players, referees, the basketball, etc.) within the playing area. In other examples, scene 402-A may be implemented as another type of scene that includes other types of objects that are to be volumetrically modeled for use in generating extended reality content or for another suitable application.

In FIG. 4B, imagery of scene 402-B and the objects 404 included therein may be captured by a built-in camera of an individual image capture device 302 directed by a user 406. The implementation of image capture device 302 in FIG. 4B is labeled as image capture device 302-B and will be understood to represent a mobile device such as a smartphone or extended reality device (e.g., which could be mounted on the head of user 406, though that implementation is not explicitly shown in FIG. 4B) that may be used by user 406 during an extended reality experience (e.g., a virtual or augmented reality experience, etc.). For instance, scene 402-B could be an indoor or outdoor location in which user 406 is engaged in an augmented reality experience and a camera built into image capture device 302 may capture imagery of the surrounding environment so as to allow the environment to be augmented with virtual elements integrated into the scene. It will be understood that scenes 402-A and 402-B are provided as examples only, and that various other implementations of image capture device 302 (as well as other types of scenes, objects, use cases, etc.) may be served by feature detection methods and systems described herein.

Returning to FIG. 3, cloud system 306 is shown to be communicatively coupled with image capture device 302 by way of a network 308 and MEC system 304, which is also communicatively coupled with image capture device 302, is shown to be implemented within network 308.

Network 308 may include any network or networks configured to transport data between endpoints such as image capture device 302, MEC system 304, cloud system 306, and/or other devices or systems in a particular implementation. In some examples, network 308 may include or be associated with a local area network, a wide area network, or the Internet. Additionally, network 308 may include a provider network such as a cellular data network (e.g., a 5G network or data network of another suitable generation) that is managed by a service provider such as a telecommunications service provider (e.g., a cellular service provider), an application service provider, a storage service provider, an internet service provider, or the like.

As shown, MEC system 304 may be implemented within network 308. For example, MEC system 304 may be implemented on the edge of the provider network within a network element such as a radio access network, a transport access point, a service access point, or another such element of the provider network. While a cloud system 306 may take advantage of certain economies of scale (along with associated efficiencies and other advantages associated therewith) that may not be available for MEC system 304, MEC system 304 may be configured to provide more responsive computational support to image capture device 302 as image capture device performs feature detection and other operations (e.g., operations 202-206 of method 200). For example, latencies of tasks performed by MEC system 304 may be significantly lower than latencies of tasks performed by cloud system 306.

As such, image capture device 302 may be used in connection with either of MEC system 304 or cloud system 306 to implement system 100 and/or otherwise support feature detection methods and other follow-on operations relying on deconstructed color image data. In certain examples, image capture device 302 may be used together with both MEC system 304 and cloud system 306 to perform different types of tasks (e.g., tasks prioritizing processing efficiencies, tasks prioritizing low-latency responsiveness, etc.) as may serve a particular implementation. In still other implementations, image capture device 302 may be configured to implement system 100 and perform all of the operations associated with method 200 without reliance on an external system such as MEC system 304 or cloud system 306.

Regardless of how system 100 is implemented, FIG. 3 shows that an original color image 310 is captured or otherwise received by image capture device 302. In conformance with a convention used in FIG. 3 and other figures herein, original color image 310 is drawn with dashed lines to indicate that this element is composed of data, rather than physical hardware (which is generally drawn using solid lines such as with system 100, image capture device 302, MEC system 304, cloud system 306, and network 308). Original color image 310 will be understood to be represented within a particular color space corresponding to a particular image format (e.g., RGB, CMYK, etc.). Original color image 310 may refer to any image that is captured by image capture device 302 or generated in some other way. However, it is referred to as "original" to differentiate this image from various color-field images and other images that are extracted or otherwise derived from the original image.

Figure 5:
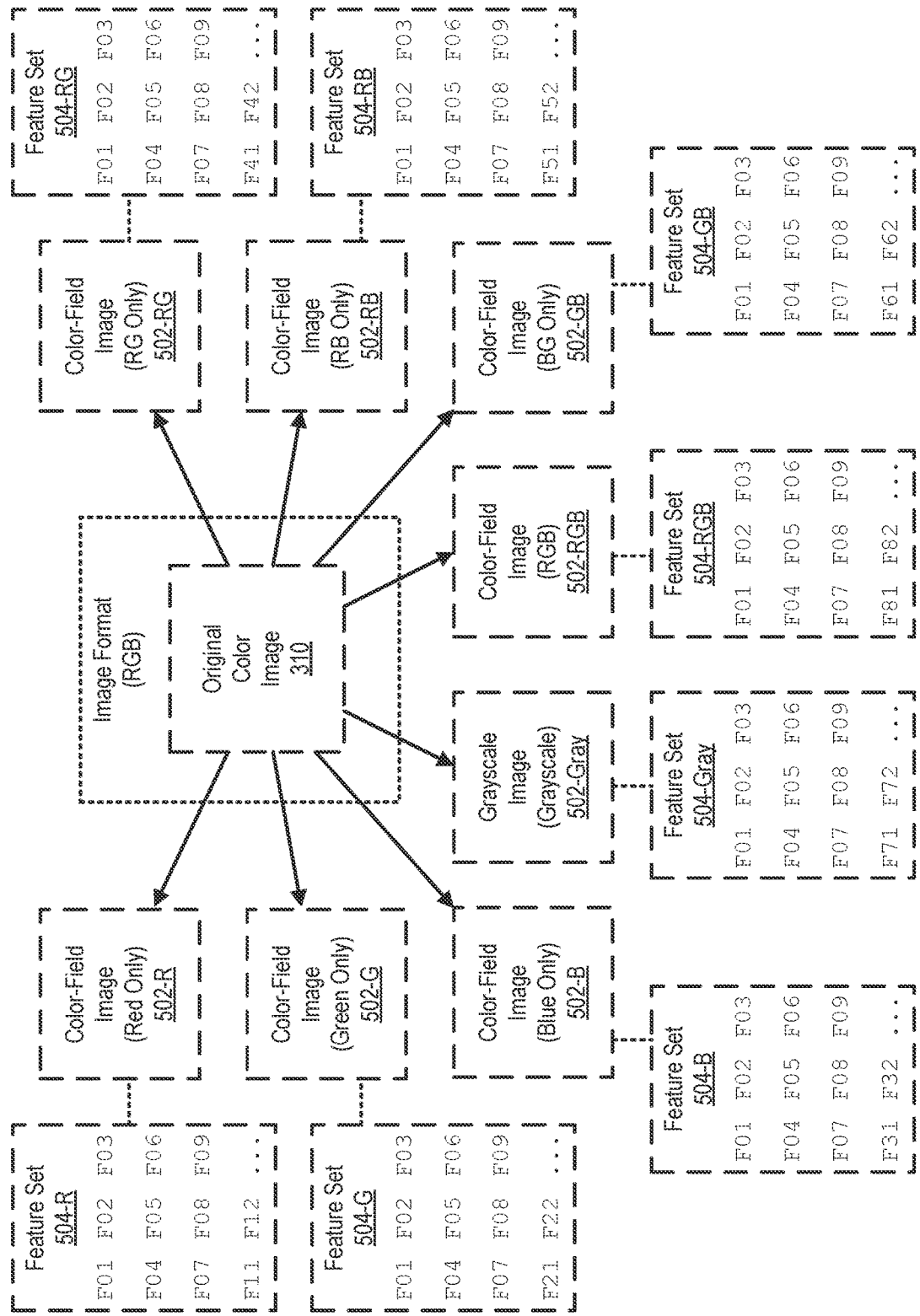
FIG. 5 shows an illustrative original color image and a variety of color-field images and features sets that may be derived therefrom in accordance with principles described herein.

To illustrate these principles and how various unique feature sets can be derived from images extracted from original color image 310, FIG. 5 shows an example in which an implementation of original color image 310 is represented in an RGB image format (shown using a dotted line encompassing original color image 310). In this example, a variety of extracted images 502 (e.g., color-field images 502-R, 502-G, 502-B, 502-RG, 502-RB, 502-BG, and 502-RGB, as well as a grayscale image 502-Gray), are shown to be extracted from original color image 310. As further shown, respective feature sets 504 (e.g., feature sets 504-R, 504-G, 504-B, 504-RG, 504-RB, 504-BG, 504-RGB, and 504-Gray) may be detected based on (e.g., derived from) each extracted image 502.

In certain implementations, the set of color-field components for a particular image format in which an original color image is represented may correspond to a set of primary colors native to that image format. In such implementations, a first subset of the set of color-field components used for a first color-field image may include a first individual primary color in the set of primary colors native to the image format, while a second subset of the set of color-field components used for a second color-field image may include a second individual primary color in the set of primary colors native to the image format (where the second individual primary color may be different from the first individual primary color). Applying this to the RGB image format used to represent original color image 310 in the example of FIG. 5, the primary colors native to the image format may be red (R), green (G), and blue (B), such that the subsets of color-field components including the individual primary colors (i.e., single primary colors rather than a combination of multiple primary colors) may include only the red, green, or blue color-field component. To illustrate, FIG. 5 shows a color-field image 502-R that uses a subset of color-field components including only the individual red color, a color-field image 502-G that uses a subset of color-field components including only the individual green color, and a color-field image 502-B that uses a subset of color-field components including only the individual blue color.

Additionally, in these or other implementations in which the set of color-field components for the image format corresponds to the set of primary colors native to the image format, a first subset of the set of color-field components used for a first color-field image may include a first combination of at least two primary colors in the set of primary colors native to the image format, while a second subset of the set of color-field components used for a second color-field image may include a second combination of at least two primary colors in the set of primary colors native to the image format (where the second combination of at least two primary colors may be different from the first combination of at least two primary colors). Applying this to the RGB image format used to represent original color image 310 in the example of FIG. 5 (in which the primary colors native to the image format are red, green, and blue), the subsets of color-field components include combinations of the individual primary colors. To illustrate, FIG. 5 shows a color-field image 502-RG that uses a subset including a combination of the red and green color-field components, a color-field image 502-RB that uses a subset including a combination of the red and blue color-field components, and a color-field image 502-GB that uses a subset including a combination of the green and blue color-field components.

Along with the individual color-field images (i.e., color-field images 502-R, 502-G and 502-B) and the combination color-field image images (i.e., color-field images 502-RG, 502-RB, and 502-GB), additional extracted images 502 may also be derived from original color image 310. As one example, system 100 may extract a combination color-field image 502-RGB that includes a combination of all three primary colors of the set of color-field components (similar or identical to the original image). As another example, system 100 may extract a grayscale image 502-Gray from original color image 310 (e.g., using the grayscale mapping equation mentioned above or in another suitable way).

While the extracted images 502 shown in FIG. 5 represent images that may be extracted from an original color image in the RGB image format, it will be understood that other types of images may be extracted from other original color images in other image formats. For instance, certain advanced cameras may use image formats from which a relatively large number of color-field images may be extracted (e.g., 36 color-field images in certain military imaging applications). Additionally, as has been mentioned, the primary colors for an image format based on an additive color space such as RGB may be different from primary colors for an image format based on a subtractive color space such as CMYK.

FIG. 5 shows unique feature sets 504 that are detected for each extracted image 502. Feature sets 504 are labeled using a similar notation as their corresponding color-field images such that, for example, feature set 504-R corresponds with color-field image 502-R and the red (R) color-field component, feature set 504-G corresponds with color-field image 502-G and the green (G) color-field component, and so forth. For illustrative purposes, features detected for each feature set 504 are represented with Fxx indicators in a monospace font (where "xx" represents digits identifying a particular feature). Thus, for example, F01 will be understood to represent one particular corner, edge, region of interest, or other feature depicted in original color image 310, F02 will be understood to represent a different such feature, and so forth.

As shown in feature sets 504, there are a number of features (e.g., F01 through F09) that happen to be detected within all of extracted images 502. For example, these image features may be highly distinctive and readily identifiable regardless of what color field is used. Additionally, image detection performed based on each extracted image 502 is shown to reveal at least one feature that is unique to that feature set. For example, when system 100 performs feature detection based on color-field image 502-R (to thereby detect feature set 504-R within color-field image 502-R), FIG. 5 shows that one or more features (features F11 and F12 in this example) detected within color-field image 502-R and included in feature set 504-R are unique to that feature set and not detected within the other extracted images 502 (i.e., so as not to be included in the other feature sets 504). Likewise, one or more other features that are detected within the other extracted images 502 (and included in other feature sets 504) are shown to not be detected within color-field image 502-R (or included in feature set 504-R). For example, just as features F11 and F12 are unique to feature set 504-R, features F21 and F22 are shown to be unique to feature set 504-G, features F31 and F32 are shown to be unique to feature set 504-B, and so forth.

For clarity of illustration, the example of FIG. 5 shows features that are either detected in every extracted image 502 and therefore included in every feature set 504 (features F01-F09) or that are unique to an individual extracted image 502 and included only in the feature set 504 of that extracted image 502 (features F11, F12, F21, F22, F31, F32, F41, F42, F51, F52, F61, F62, F71, F72, F81, and F82). It will be understood, however, that feature detection may not always line up so neatly as illustrated in FIG. 5. For example, certain features (e.g., additional features not explicitly shown but represented by ellipsis in each of the feature sets 504) may be detected in more than one but less than all of the extracted images 502. For example, as mentioned above, if original color image 310 depicts a red boat afloat on a blue sea, certain image features may be readily detected in both a red and a blue color-field image (color-field images 502-R and 502-B) while not being detected reliably in a grayscale image such as grayscale image 502-Gray (or perhaps other extracted images 502 such as green color-field image 502-G). In any case, it will be understood that more information (and information that is more useful and reliable) may be derived from original color image 310 when the image is analyzed along the various different dimensions afforded by the various extracted images 502 generated by deconstructing the color image data according to principles described herein.

Thorough and robust feature detection performed by analyzing deconstructed color image data as shown in FIG. 5 may result in a large amount of feature data which may be further processed and used to accomplish and improve a variety of follow-on operations. For example, the further processing may include correlating detected features between different features sets (e.g., determining that F01 in feature set 504-R is the same feature as F01 in feature set 504-G while recognizing that F11 and F21 are distinct features unique to their own features sets) to generate a consolidated feature set for original color image 310. In other examples, this consolidating step may not be performed at this stage. Instead, as will be described in more detail below, follow-on operations may be performed separately for each subset of color-field components (e.g., for each extracted image 502) and consolidation may follow these analyses.

Various follow-on operations employing the comprehensive and accurate feature detection methods described herein may include any image processing operations as may serve a particular implementation.

As a first example of a follow-on operation that may benefit from comprehensive and accurate feature detection such as described in relation to FIG. 5, calibration may be performed for image capture devices in a formation used for volumetric capture (e.g., image capture devices 302-A described above in relation to FIG. 4A). More specifically, subsequent to extracting various color-field image and/or grayscale images and detecting respective sets of features within the extracted images, system 100 may calibrate, based on the detected sets of features, an image capture device that captured the original color image. For example, system 100 may correlate common features captured by different image capture devices from different viewpoints and use this information to determine extrinsic parameters or other calibration parameters defining the spatial relationship of the different image capture devices.

Calibration operations of this sort are generally most successful and straightforward when imagery can be captured that has readily-identifiable features that can be reliably and confidently correlated between different image capture devices at different vantage points. For example, a calibration object (e.g., a chessboard object or the like) may be designed to provide extremely high contrast and well-defined features (e.g., lines and corners between black and white checkered squares) when inserted and moved within a scene as different image capture devices (e.g., image capture devices 302-A from FIG. 4A) capture imagery forming the basis for calibration parameters. In implementations described herein to perform feature detection based on deconstructed color image data, it may be advantageous for calibration objects used in this way to provide well-defined features in various types of color-field images and other extracted images. As such, rather than (or in addition to) conventional black and white calibration objects, these implementations may make use of a colored calibration object. Specifically, for example, calibration operations may be performed that involve an original color image that depicts a calibration object incorporating 1) a first geometric shape (e.g., a square, triangle, etc.) of a first color associated with a first subset of the set of color-field components (e.g., a red color if the first subset includes only the red color-field component, a blue-green color if the first subset includes a combination of blue and green color-field components, etc.), and 2) a second geometric shape of a second color associated with the second subset of the set of color-field components.

To illustrate, FIG. 6 shows an illustrative calibration object 600 that may be held by an operator standing in a scene such as scene 402-A in FIG. 4A during the process of calibrating image capture devices 302-A. As shown, square geometric shapes are arranged in a checked pattern in a manner similar to conventional calibration objects. However, rather than being implemented by black and white squares, these squares are shown to be colored in according with the color-field components (red, green, and blue) of the RGB image format used for various examples described herein. In this way, calibration may be improved as comprehensive and robust feature detection is facilitated by deconstructed color image data captured by image capture devices at different viewpoints with respect to calibration object 600.

As a second example of a follow-on operation that may benefit from comprehensive and accurate feature detection such as described in relation to FIG. 5, depth mapping and surface reconstruction for a scene may be performed based on imagery captured by image capture devices at different viewpoints with a known relationship (e.g., due to the image capture devices arranged at those viewpoints having already been calibrated). For example, an implementation of system 100 may have access to color images captured by a plurality of different image capture devices. These image capture devices may have different viewpoints, such as by being separate devices arranged at different locations around a scene (e.g., image capture devices 302-A in FIG. 4A) or by being integrated together as stereoscopic image capture devices in a single image capture system. In this latter example, system 100 may capture an original color image and an additional color image simultaneously from stereoscopically-related viewpoints of a scene. As used herein, stereoscopically-related viewpoints refer to viewpoints that have a predefined (e.g., predetermined, precalibrated, etc.) relationship such that differences between imagery captured from the viewpoints can be used to determine depth data. For example, a given image capture system may include a pair of image capture devices (e.g., including separate lenses, image sensors, etc.) that are integrated together in a single enclosure and are placed a known distance apart such that the image capture system may be used to capture not only image data but also depth data.

After extracting first and second color-field images and detecting first and second sets of features in accordance with method 200, this type of system 100 implementation may be further configured to extract third and fourth color-field images from an additional color image captured by a different image capture device (e.g., one with a stereoscopically-related viewpoint to the viewpoint of the image capture device that captured the original color image) that is associated with the same set of color-field components (e.g., red, green, and blue color-field components in the RGB image format example). The third color-field image may be associated with the first subset of the set of color-field components (i.e., the same subset with which the first color-field image is associated) and the fourth color-field image may be associated with the second subset of the set of color-field components (i.e., the same subset with which the second color-field image is associated). In a similar way as described above for detecting features of the first and second color-field images (e.g., at operation 206 of method 200), system 100 may detect a third set of features within the third color-field image and a fourth set of features within the fourth color-field image. System 100 may then generate a first depth map for the scene based on the first and third sets of features and generate a second depth map for the scene based on the second and fourth sets of features. Based on these first and second depth maps, system 100 may then generate a consolidated depth map for the scene, which may be more accurate, comprehensive, robust, and reliable than either the first or second depth maps on their own, due to the improved feature detection that arises by processing the different color-field images separately.

To illustrate, FIG. 7A shows an image capture system that includes twin image capture devices capturing images of an object from stereoscopically-related viewpoints to map the depth of the object. FIG. 7B then shows an illustrative dataflow for generating a consolidated depth map of the object of FIG. 7A based on deconstructed color image data in accordance with principles described herein.

More particularly, FIG. 7A shows an image capture system 702 having two image capture devices 702-L (left) and 702-R (right) that have stereoscopically-related viewpoints represented by their similar but different fields of view 704 (i.e., field of view 704-L for image capture device 702-L and field of view 704-R for image capture device 702-R). From their respective fields of view 704, image capture devices 702-L and 702-R may each capture imagery for an object 706, shown in FIG. 7A as a V-shaped block that exposes to image capture system 702 several surfaces having different depths with respect to the image capture system. For example, object 706 may represent one of objects 404 in one of scenes 402 described above in relation to FIGS. 4A and 4B, while image capture system 702 may represent one of image capture devices 302-A or 302-B shown in these figures.

Referring now to FIG. 7B, a dataflow 708 shows two original color images 710 (original color image 710-L (left) and 710-R (right)) that will be understood to have been captured by the respective image capture devices of image capture system 702. Specifically, original color image 710-L may be captured by image capture device 702-L while original color image 710-R may be captured by image capture device 702-R simultaneously and from the stereoscopically-related viewpoint shown in FIG. 7A. As further shown in dataflow 708, system 100 may extract several color-field images 712 from each of original color images 710. Specifically, for the illustrative example of FIG. 7B, four color-field images 712 are extracted from each of original color images 710 (i.e., color-field images 712-L1 through 712-L4 from original color image 710-L and color-field images 712-R1 through 712-R4 from original color image 710-R). The reference labels used for each color-field image 712 will be understood to be used consistently to indicate the subset of color-field components with which the color-field image 712 is associated. For example, both color-field images 712 that end with "1" (i.e., color-field image 712-L1 and 712-R1) may be associated with a subset of color-field component that includes only the red color-field component, only the green color-field component, a combination of the red and blue color-field components, or some other subset such as has been described herein. This same principle may likewise apply to color-field images 712 ending with "2", "3", and "4", and it will be understood that each of these pairs of color-field images may be associated with any suitable subset of color-field components included in any image format as may serve a particular implementation.

For each different subset of color-field components (i.e., for each pair of color-field images 712), dataflow 708 shows that a respective depth map 714 may be generated. Specifically, as shown, a depth map 714-1 is generated based on color-field images 712-L1 and 712-R1 (which, for example, may both be based on the red (R) color-field component), a depth map 714-2 is generated based on color-field images 712-L2 and 712-R2 (which, for example, may both be based on the green (G) color-field component), a depth map 714-3 is generated based on color-field images 712-L3 and 712-R3 (which, for example, may both be based on the blue (B) color-field component), and a depth map 714-4 is generated based on color-field images 712-L4 and 712-R4 (which, for example, may both be based on some combination of color-field component such as the red and blue color-field components).

Because different features will be detected in each color-field image, depth maps 714-1 through 714-4 may be similar but not identical. For example, for certain features, depth map 714-1 may be highly accurate while depth map 714-2 may be somewhat less reliable. For other features, depth map 714-1 may be associated with less confidence while depth map 714-3 may have the best depth data. To illustrate, FIG. 7A shows lines having different line styles and each labeled with corresponding depth maps 714 to roughly outline the surfaces of object 706 that are visible from the viewpoints of image capture devices 702-L and 702-R. These lines represent the depth values for object 706 according to each of the different depth maps 714-1 through 714-4. As shown, each depth mapping may be similar but certain depth maps are more accurate than others, or are more accurate in certain places.

Accordingly, as further shown in dataflow 708, a consolidated depth map 716 may be generated based on the different depth maps 714-1 through 714-4. The consolidation of depth maps 714 may be performed in any suitable way and using any suitable technologies. For example, weighted averaging techniques may be employed in which depth maps for different color-field components track different confidence values for their depth values based on how well the color-field components allow for individual depth values to be calculated. This may be performed on a pixel-by-pixel basis, a region-by-region basis, or in another suitable way. Statistical analysis, machine learning technologies, mean-based or median-based averaging, least square feet, shape from shading analyses, and/or other techniques, technologies, and/or approaches may be used to consolidate depth maps 714 in a manner that results in a consolidated depth map 716 that is optimized for a particular implementation.

As has been described, one challenge that is addressed by feature detection methods and systems that use deconstructed color image data relates to features that become lost or obscured when an original color image is converted to grayscale under conventional feature detection paradigms. For instance, as mentioned above, details that would be readily discernable in color (e.g., for a red boat floating in a blue sea, etc.) may be become obfuscated when the color information is lost in the grayscale conversion (e.g., such that both the boat and the waves are represented using similar shades of gray). Even when individual color-field images are used in addition or as an alternative to such grayscale images (as has been described herein), however, similar challenges may still arise in a particular color-field image that is being analyzed. For instance, if a large portion of the boat-on-the-sea image described in this example depicts a gradient of smooth blue water going gradually from one shade of blue to a slightly darker shade of blue, it may be difficult to identify any image features in that portion of the image even when a blue color-field image is used.

To address situations like this in which features may be sparse, it may be desirable to increase a contrast property and/or decrease a resolution property of the image. Indeed, the reason that a chessboard (or similar) calibration object may be advantageous for use in calibrating image capture devices is precisely because the checkerboard represents an extremely high-contrast (e.g., black and white) and low-resolution object for which image features (e.g., corners where squares connect, etc.) are straightforward to reliably identify and correlate. Accordingly, as part of method 200 or other operations described herein, system 100 may be configured to perform (e.g., prior to the detecting of the first and second sets of features at operation 206) an image processing operation on the first and second color-field images. For instance, this image processing operation may be configured to accomplish increasing the contrast property of the first and second color-field images, decreasing the resolution property of the first and second color-field images, or otherwise facilitating feature detection within the color-field images.

Figure 8:
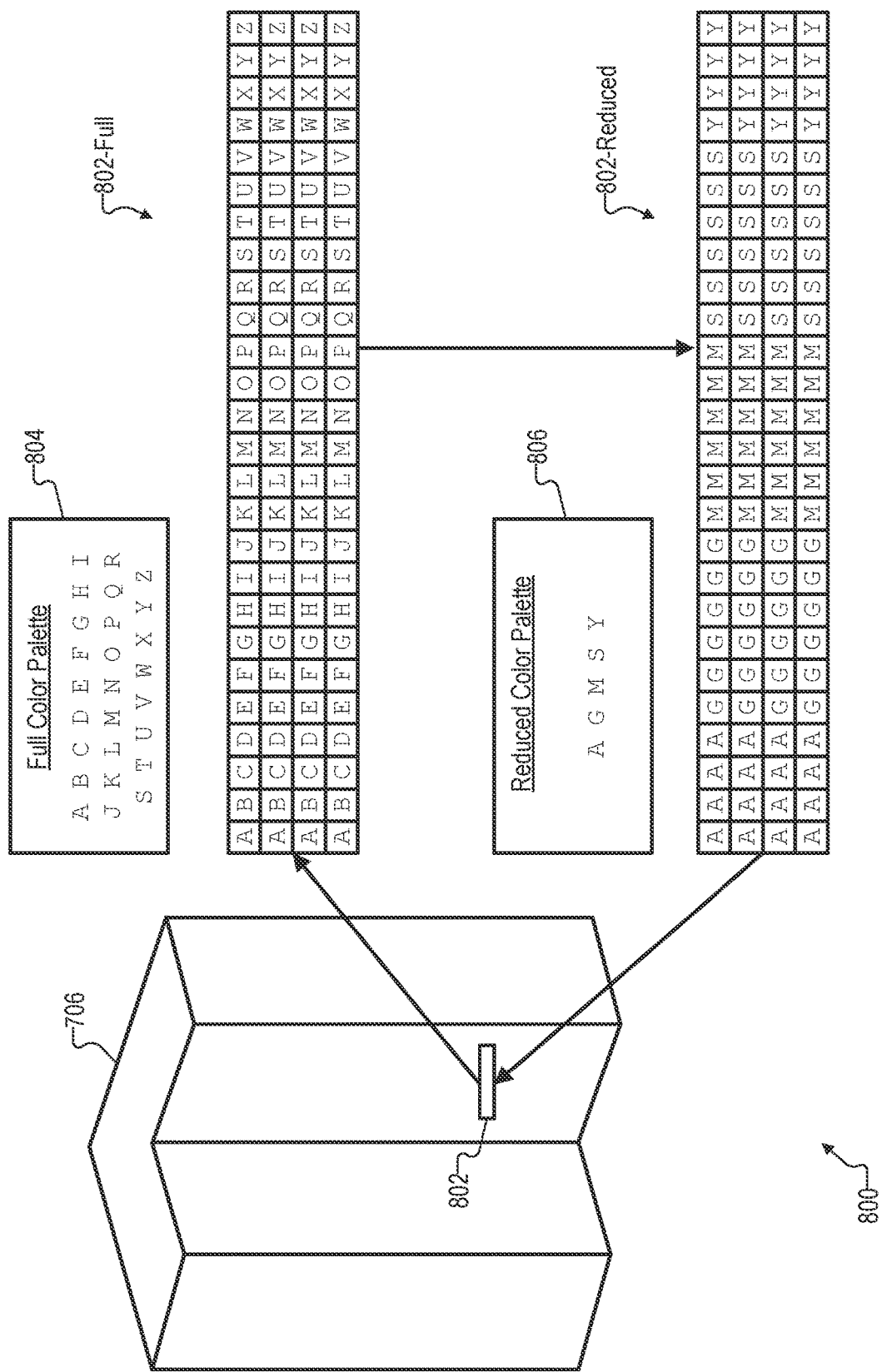
FIG. 8 shows illustrative aspects of an image processing operation configured to increase a contrast property and/or decrease a resolution property of a color-field image in accordance with principles described herein.

To illustrate one example of a way that an image processing operation 800 may increase the contrast property and/or decrease the resolution property of a particular color-field image, FIG. 8 will now be described. In the example of FIG. 8, an image processing operation is configured to accomplish the increasing of the contrast of an object depicted in a particular color-field image by 1) defining a reduced color palette set including a reduced number of colors fewer than a total number of colors represented within the first and second color-field images; and 2) for each pixel of the particular color-field image that has a color excluded from the reduced color palette, reassigning the color of the pixel to a nearest color that is included in the reduced color palette. It will be understood that the same technique can be used on multiple color-field images (e.g., color-field images associated with different subsets of color-field components, color-field images derived from different original color images, etc.) so as to improve feature detection generally, as well as follow-on operations (calibration operations, depth mapping operations, surface reconstruction operations, etc.) that may be based on the detected features.

As shown in FIG. 8, a perspective view of object 706 (e.g., captured by image capture system 702 as described above) is shown to include various surfaces that are smooth and relatively featureless. If the image capture devices of image capture system 702 are capable of capturing a large number of colors and pixels, such smooth surfaces may have relatively high resolutions and low contrasts that, while making the images look realistic, may introduce challenges for feature detection for the reasons that have been described.

To illustrate, a small region 802 of one surface of object 706 is shown to be captured and blown up so that individual pixels can be viewed. Specifically, a view 802-Full shows a 26×4 grid of squares that will be understood to represent pixels within region 802 of object 706. Letters A-Z printed on each square will be understood to represent colors in a smooth gradient. For example, if object 706 is red, then the color represented by "A" on the left side of view 802-Full may be one shade of red, the color represented by "Z" on the right side of view 802-Full may be a slightly different shade of red (e.g., a slightly darker shade), and colors represented by "B" through "Y" may represent shades of red between "A" and "Z" that produce a progressive color gradient from shade "A" to shade "Z". Because each color "A"-"Z" may be so similar in shade to its immediate neighbors, it may be difficult for a feature detection algorithm to reliably detect any image features within region 802.

To address this challenge, image processing operation 800 shows that system 100 may replace a full color palette 804 that includes all the colors "A" to "Z" (as well as other colors that are not shown as they are not relevant to the present example) with a reduced color palette 806 that excludes some or many of the colors of full color palette 804 (e.g., colors "B"-"F", "H"-"L", "N"-"R", "T"-"X", and "Z" in this example). As shown by a view 802-Reduced of the same pixels, for each pixel that has one of the colors that is excluded from reduced color palette 806 (i.e., each pixel that does not have the color "A", "G", "M", "S", or "Y" in this example), system 100 reassigns the color of the pixel to a nearest color that is included in the reduced color palette. Accordingly, as shown, the gradient will now have a lower resolution (e.g., a more pixelated look) and an increased contrast, resulting in larger color differences, for example, between "A" and "G" and between "G" and "M" in view 802-Reduced than existed in view 802-Full between "A" and "B" and between "G" and "H". When this principle is applied to the entire object 706 and/or the entire color-field image of which the depiction of object 706 is a part (rather than just to region 802 as shown in FIG. 8), this may facilitate the detection of various types of features and lead to outcomes that are further improved.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 9:
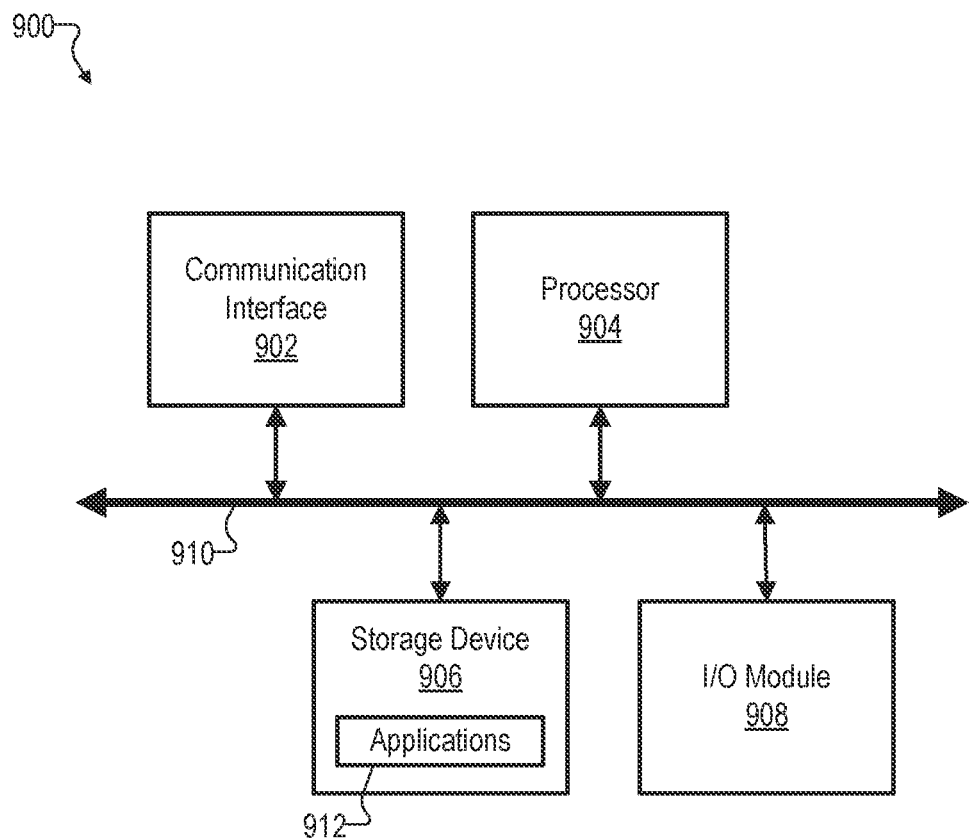
FIG. 9 shows an illustrative computing device that may implement image processing systems and/or other systems and devices described herein in accordance with principles described herein.

FIG. 9 shows an illustrative computing device 900 that may implement image processing systems and/or other systems and devices described herein in accordance with principles described herein. For example, computing device 900 may include or implement (or partially implement) an image processing system such as system 100 or any component included therein or any system or device associated therewith (e.g., image capture device 302, MEC system 304, cloud system 306, elements of network 308, etc.).

As shown in FIG. 9, computing device 900 may include a communication interface 902, a processor 904, a storage device 906, and an input/output (I/O) module 908 communicatively connected via a communication infrastructure 910. While an illustrative computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 906. For example, data representative of one or more executable applications 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. One or more I/O modules may be used to receive input for a single virtual experience. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, one or more applications 912 residing within storage device 906 may be configured to direct processor 904 to perform one or more processes or functions associated with processor 104 of system 100. Likewise, memory 102 of system 100 may be implemented by or within storage device 906.

To the extent the aforementioned embodiments collect, store, and/or employ personal information of individuals, groups, or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information may be in an appropriately secure manner reflective of the type of information, for example, through various access control, encryption, and anonymization techniques for particularly sensitive information.

In the preceding specification, various example embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The specification and drawings are accordingly to be regarded in an illustrative rather than a restrictive sense.

What is claimed is:

1. A method comprising:
extracting, by an image processing system, a first color-field image from an original color image associated with a set of color-field components, the first color-field image associated with a first subset of the set of color-field components;
extracting, by the image processing system, a second color-field image from the original color image, the second color-field image associated with a second subset of the set of color-field components, the second subset different from the first subset;
detecting, by the image processing system, a first set of features within the first color-field image and a second set of features within the second color-field image;
extracting, by the image processing system, a third color-field image from an additional color image, wherein the original color image and the additional color image are captured from related viewpoints of a scene;
detecting, by the image processing system, a third set of features within the third color-field image; and
generating, by the image processing system and based on the third set of features and at least one of the first and second sets of features, a depth map for the scene.

2. The method of claim 1, further comprising:
extracting, by the image processing system, a third color-field image from an additional color image associated with the set of color-field components, wherein:
the third color-field image is associated with the first subset of the set of color-field components, and
the original color image and the additional color image are captured simultaneously from stereoscopically-related viewpoints of a scene;
extracting, by the image processing system, a fourth color-field image from the additional color image, the fourth color-field image associated with the second subset of the set of color-field components;
detecting, by the image processing system, a third set of features within the third color-field image and a fourth set of features within the fourth color-field image;

generating, by the image processing system and based on the first and third sets of features, a first depth map for the scene; and generating, by the image processing system and based on the second and fourth sets of features, a second depth map for the scene.

3. The method of claim 2, further comprising generating, by the image processing system and based on the first and second depth maps, a consolidated depth map for the scene.

4. The method of claim 1, further comprising calibrating, by the image processing system and based on the first and second sets of features, an image capture device that captured the original color image.

5. The method of claim 4, wherein the original color image used for the calibrating of the image capture device depicts a calibration object incorporating:
a first geometric shape of a first color associated with the first subset of the set of color-field components; and
a second geometric shape of a second color associated with the second subset of the set of color-field components.

6. The method of claim 1, further comprising performing, by the image processing system and prior to the detecting of the first and second sets of features, an image processing operation on the first and second color-field images, the image processing operation configured to accomplish one or more of:
increasing a contrast property of the first and second color-field images, or
decreasing a resolution property of the first and second color-field images.

7. The method of claim 6, wherein the image processing operation is configured to accomplish the increasing of the contrast property of the first and second color-field images by:
defining a reduced color palette including a reduced number of colors fewer than a total number of colors represented within the first and second color-field images; and
for each pixel of the first and second color-field images that have a color excluded from the reduced color palette, reassigning the color of the pixel to a nearest color that is included in the reduced color palette.

8. The method of claim 1, wherein:
the set of color-field components corresponds to a set of primary colors native to an image format in which the original color image is represented;
the first subset of the set of color-field components includes a first individual primary color in the set of primary colors native to the image format; and
the second subset of the set of color-field components includes a second individual primary color in the set of primary colors native to the image format, the second individual primary color different from the first individual primary color.

9. The method of claim 1, wherein:
the set of color-field components corresponds to a set of primary colors native to an image format in which the original color image is represented;
the first subset of the set of color-field components includes a first combination of at least two primary colors in the set of primary colors native to the image format; and
the second subset of the set of color-field components includes a second combination of at least two primary colors in the set of primary colors native to the image format, the second combination of at least two primary colors different from the first combination of at least two primary colors.

10. The method of claim 1, further comprising:
extracting, by the image processing system, a grayscale image from the original color image; and
detecting, by the image processing system, a third set of features within the grayscale image;
wherein:
the at least one feature detected within the first color-field image and included in the first set of features is not detected within the grayscale image or included in the third set of features, and
at least one additional feature is detected within the grayscale image and included in the third set of features while not being detected within the first or second color-field images or included in the first or second sets of features.

11. A system comprising:
a memory storing instructions; and
a processor communicatively coupled to the memory and configured to execute the instructions to:
extract a first color-field image from an original color image associated with a set of color-field components, the first color-field image associated with a first subset of the set of color-field components;
extract a second color-field image from the original color image, the second color-field image associated with a second subset of the set of color-field components, the second subset different from the first subset;
detect a first set of features within the first color-field image and a second set of features within the second color-field image;
extracting a third color-field image from an additional color image, wherein the original color image and the additional color image are captured from related viewpoints of a scene;
detecting a third set of features within the third color-field image; and
generating, and based on the third set of features and at least one of the first and second sets of features, a depth map for the scene.

12. The system of claim 11, wherein the processor is further configured to execute the instructions to:
extract a third color-field image from an additional color image associated with the set of color-field components, wherein:
the third color-field image is associated with the first subset of the set of color-field components, and
the original color image and the additional color image are captured simultaneously from stereoscopically-related viewpoints of a scene;
extract a fourth color-field image from the additional color image, the fourth color-field image associated with the second subset of the set of color-field components;
detect a third set of features within the third color-field image and a fourth set of features within the fourth color-field image;
generate, based on the first and third sets of features, a first depth map for the scene; and
generate, based on the second and fourth sets of features, a second depth map for the scene.

13. The system of claim 12, wherein the processor is further configured to execute the instructions to generate, based on the first and second depth maps, a consolidated depth map for the scene.

14. The system of claim 11, where the processor is further configured to execute the instructions to calibrate, based on the first and second sets of features, an image capture device that captured the original color image.

15. The system of claim 14, wherein the original color image used for the calibrating of the image capture device depicts a calibration object incorporating:
a first geometric shape of a first color associated with the first subset of the set of color-field components; and
a second geometric shape of a second color associated with the second subset of the set of color-field components.

16. The system of claim 11, wherein the processor is further configured to execute the instructions to perform, prior to the detecting of the first and second sets of features, an image processing operation on the first and second color-field images, the image processing operation configured to accomplish one or more of:
increasing a contrast property of the first and second color-field images, or
decreasing a resolution property of the first and second color-field images.

17. The system of claim 16, wherein the image processing operation is configured to accomplish the increasing of the contrast property of the first and second color-field images by:
defining a reduced color palette including a reduced number of colors fewer than a total number of colors represented within the first and second color-field images; and
for each pixel of the first and second color-field images that have a color excluded from the reduced color palette, reassigning the color of the pixel to a nearest color that is included in the reduced color palette.

18. The system of claim 11, wherein:
the set of color-field components corresponds to a set of primary colors native to an image format in which the original color image is represented;
the first subset of the set of color-field components includes a first individual primary color in the set of primary colors native to the image format; and
the second subset of the set of color-field components includes a second individual primary color in the set of primary colors native to the image format, the second individual primary color different from the first individual primary color.

19. The system of claim 11, wherein:
the set of color-field components corresponds to a set of primary colors native to an image format in which the original color image is represented;
the first subset of the set of color-field components includes a first combination of at least two primary colors in the set of primary colors native to the image format; and
the second subset of the set of color-field components includes a second combination of at least two primary colors in the set of primary colors native to the image format, the second combination of at least two primary colors different from the first combination of at least two primary colors.

20. A non-transitory computer-readable medium storing instructions that, when executed, direct a processor of a computing device to:
extract a first color-field image from an original color image associated with a set of color-field components, the first color-field image associated with a first subset of the set of color-field components;
extract a second color-field image from the original color image, the second color-field image associated with a second subset of the set of color-field components, the second subset different from the first subset;
detect a first set of features within the first color-field image and a second set of features within the second color-field image;
extracting a third color-field image from an additional color image, wherein the original color image and the additional color image are captured from related viewpoints of a scene;
detecting a third set of features within the third color-field image; and
generating, and based on the third set of features and at least one of the first and second sets of features, a depth map for the scene.

* * * * *